US008622749B2

(12) United States Patent
Scolari et al.

(10) Patent No.: US 8,622,749 B2
(45) Date of Patent: Jan. 7, 2014

(54) FOUR BAR DRIVE LINK SYSTEM SIMULATOR

(75) Inventors: Nathan Anthony Scolari, Greenville, SC (US); Daniel Robert Cabral, Greenville, SC (US); Geoffrey Michael Bergmark, Hendersonville, NC (US); Robert Wayne Lewis, Jr., Duncan, SC (US)

(73) Assignee: ZIKE, LLC, Greenville, SC (US)

( * ) Notice: Subject to any disclaimer, the term of this patent is extended or adjusted under 35 U.S.C. 154(b) by 471 days.

(21) Appl. No.: 12/862,391

(22) Filed: Aug. 24, 2010

(65) Prior Publication Data
US 2012/0052477 A1    Mar. 1, 2012

(51) Int. Cl.
*G09B 25/00* (2006.01)
(52) U.S. Cl.
USPC .......................................... 434/373
(58) Field of Classification Search
USPC .......................................... 434/373
See application file for complete search history.

(56) References Cited

U.S. PATENT DOCUMENTS

| | | | | |
|---|---|---|---|---|
| 3,619,830 A | * | 11/1971 | Harris et al. | 8/149.1 |
| 3,718,989 A | * | 3/1973 | McKnight | 434/40 |
| 4,399,909 A | * | 8/1983 | Gorelik | 198/852 |
| 4,567,782 A | * | 2/1986 | Speicher et al. | 74/96 |
| 4,775,289 A | * | 10/1988 | Kazerooni | 414/735 |
| 5,584,700 A | * | 12/1996 | Feldman et al. | 434/247 |
| 5,707,321 A | * | 1/1998 | Maresh | 482/57 |
| 6,264,588 B1 | * | 7/2001 | Ellis | 482/137 |
| 6,283,758 B1 | * | 9/2001 | Waller | 434/44 |
| 6,387,017 B1 | * | 5/2002 | Maresh | 482/57 |
| 7,624,648 B2 | * | 12/2009 | Nickel et al. | 73/856 |
| 7,766,802 B2 | * | 8/2010 | Webber et al. | 482/100 |
| 7,788,744 B2 | * | 9/2010 | Calilung et al. | 5/109 |
| 7,855,712 B2 | * | 12/2010 | Powers et al. | 345/156 |
| 7,901,335 B2 | * | 3/2011 | Webber et al. | 482/72 |
| 8,128,111 B2 | * | 3/2012 | Scolari et al. | 280/221 |

* cited by examiner

*Primary Examiner* — Kurt Fernstrom
*Assistant Examiner* — Dolores Collins

(57) ABSTRACT

A four bar drive link system simulator 10 has a frame assembly 11, a proximal hinge attachment bracket 20, a bottom bracket simulator 40, a pair of crank levers 31L, 31R, a pair of coupling levers 32 and a pair of pedal simulator levers 22L, 22R. The frame assembly 11 has a plurality of guide rails, including at least a proximal hinge adjustment rail 22, and a frame simulator rail 13. The proximal hinge attachment bracket 20 is connected to the proximal hinge adjustment rail 22. The bottom bracket simulator 40 is attached or otherwise connected to the frame simulator rail 13. The pair of crank levers 31L, 31R is each attached at a first end to an axle 42 having its axis of rotation in the bottom bracket simulator 40, one crank lever being on one side of the bottom bracket simulator 40, the other on the opposite side. The pair of coupling levers 32 is each attached to an opposite second end of the crank lever 31L or 31R. The pair of pedal simulator levers 22R, 22L is each pivotally attached to an end of the coupling lever 32 and to an axle 23 having an axis of rotation 50 at the proximal hinge attachment bracket 20. The relative dimensions between the axis of rotation of proximal hinge and axis of rotation of the bottom bracket 40 are adjustable by movement along the proximal hinge guide rail 22 or the frame simulator guide rail 13 or a combination of both.

8 Claims, 17 Drawing Sheets

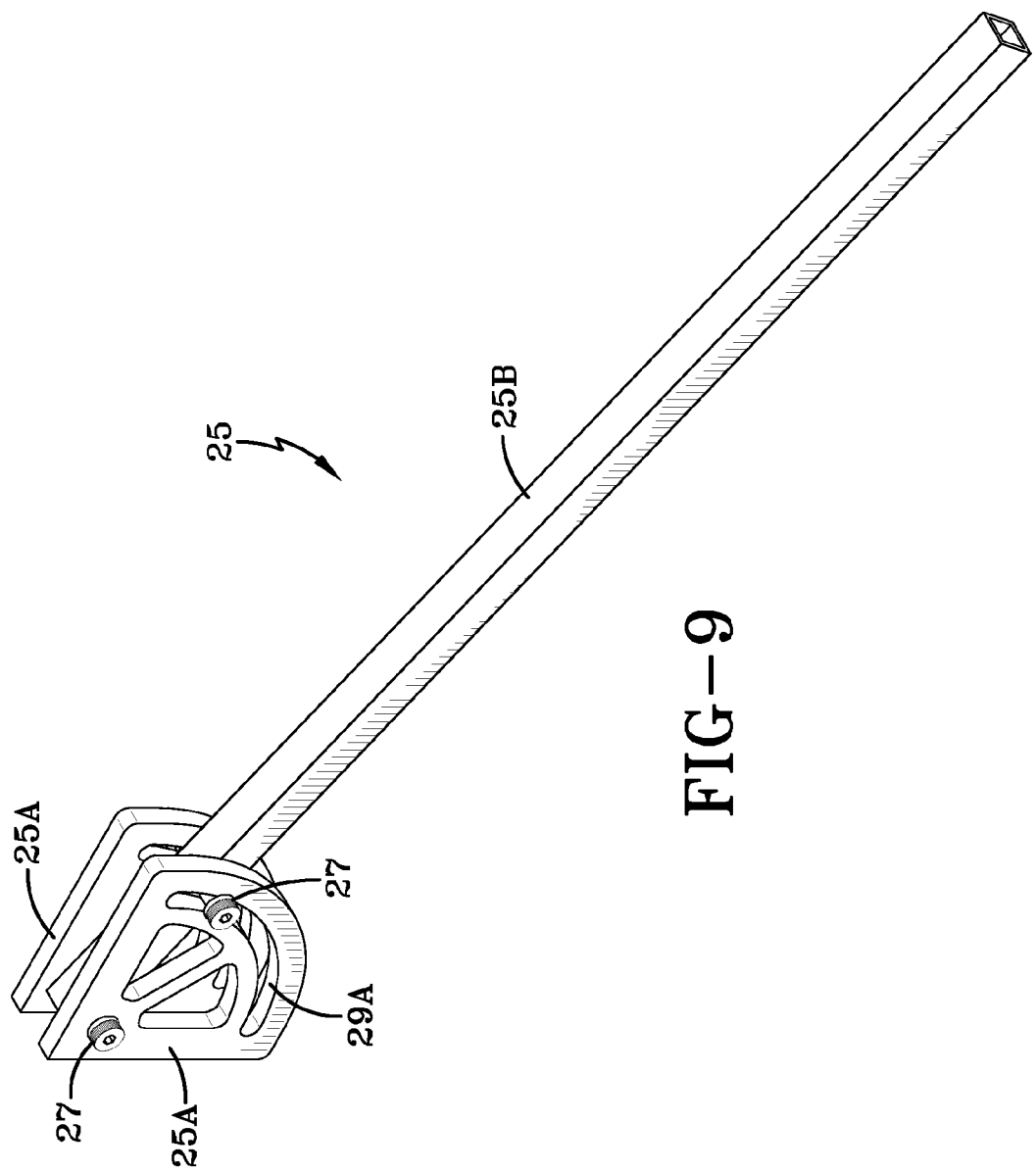

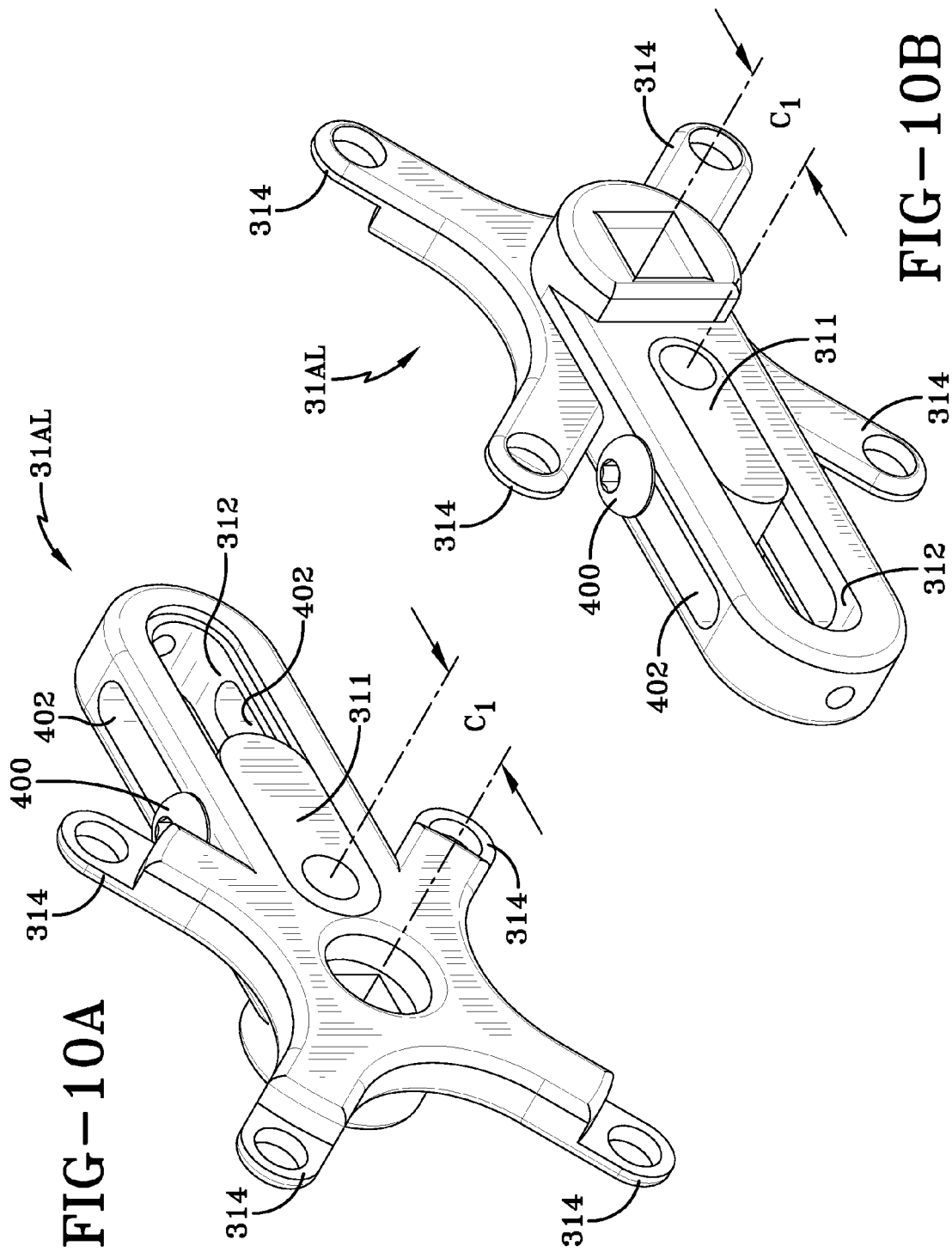

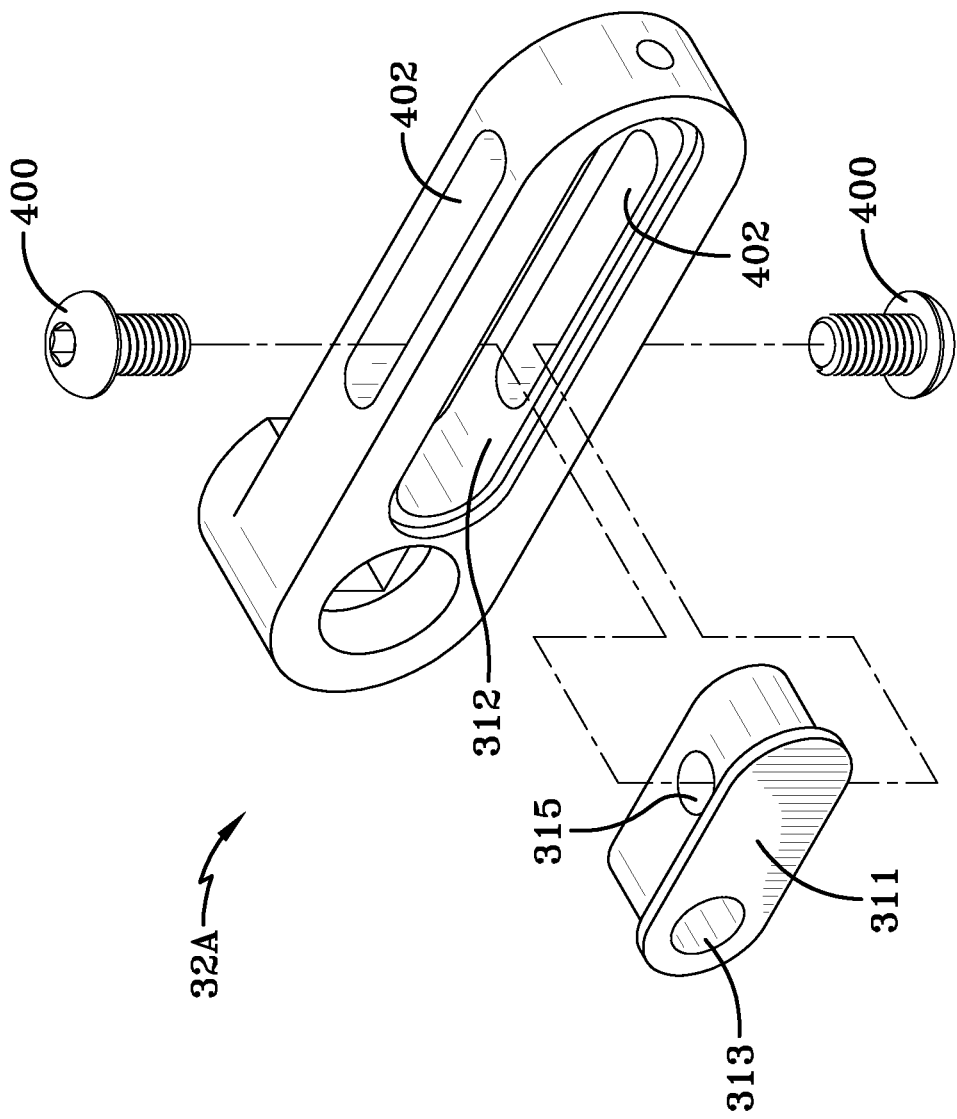

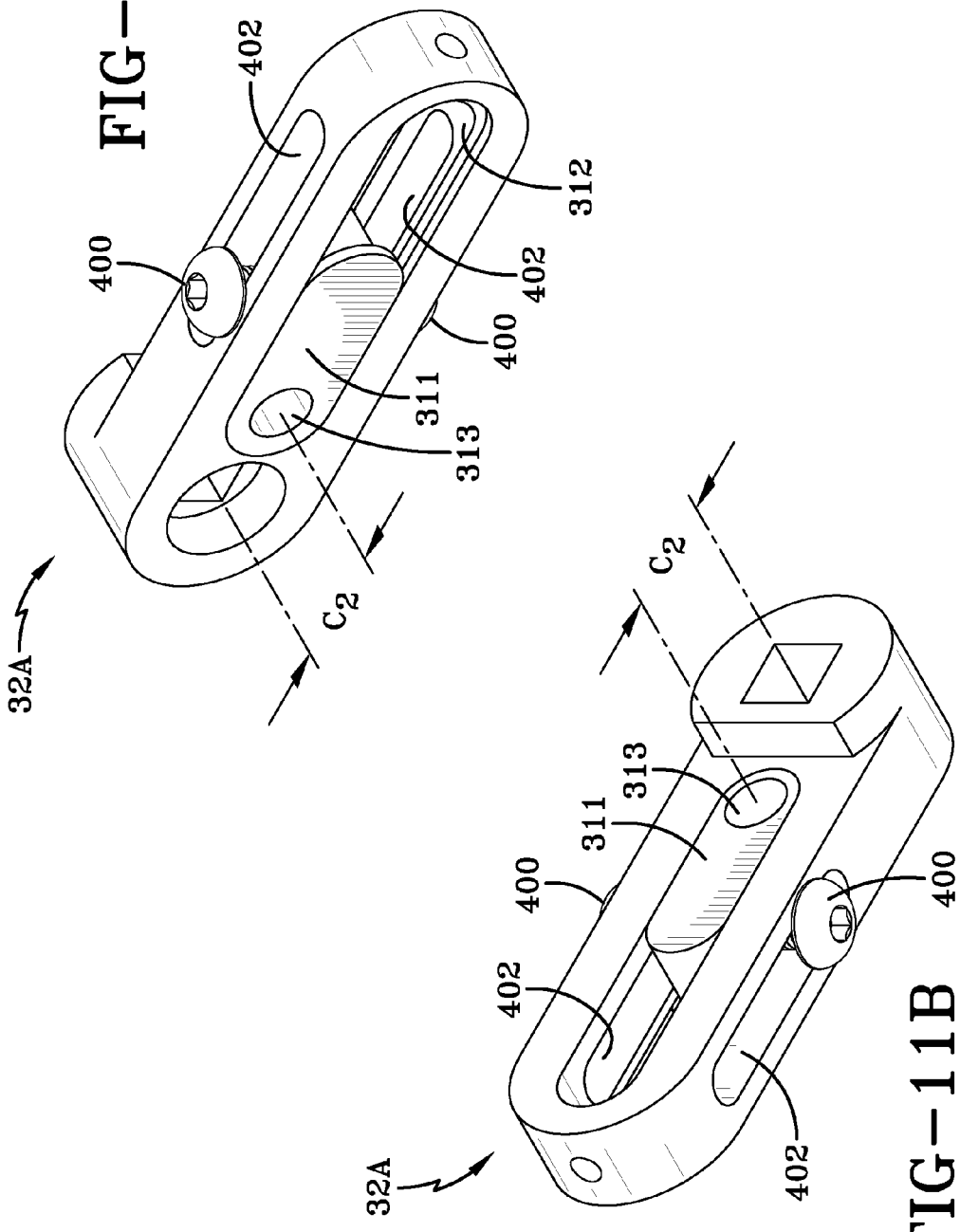

FOUR BAR DRIVE LINK SYSTEM SIMULATOR

TECHNICAL FIELD

This invention relates to a mechanical fixture which simulates a four bar link drive system for pedal driven scooters and bicycles. More particularly the simulator allows a wide range of link dimensions to be quickly evaluated for pedal performance and provides an easy way to find a set of dimensional solutions for optimal pedal performance. The simulator replicates the pedal action and accurately permits the evaluation each of the four link dimensions.

BACKGROUND OF THE INVENTION

Pedal driven bicycles have been well known in the art of man powered vehicles. The most common pedal system uses a chain driven pair of sprockets to which pedals are attached to the front drive sprocket while a chain is attached to the front drive sprocket and the rear wheel sprocket propelling the rear wheel to provide movement. This system has the pair of pedals positioned 180 degrees relative to the other, so in combination, they rotate 360 degrees about the axis of rotation of the drive sprocket; with the rider exerting maximum force on each downward motion on each pedal. This is a most simple and efficient way to move a two wheeled bicycle.

A more complicated, but arguably superior drive system for a bicycle or scooter has been developed utilizing a four bar link drive mechanism. The drive mechanism employs a drive sprocket attached to a bottom bracket fixed onto a bicycle or scooter frame, a crank link attached to the drive sprocket or the axle of the drive sprocket and rotationally fixed to the rotation of the drive sprocket, a coupling link attached at one end to the crank link and at an opposite end to a foot pedal, the foot pedals being pivotally attached at one end to the crank link and at an opposite end, the foot pedal is pivotally attached at an end, called the proximal hinge location of the vehicle frame forming a four bar linkage assembly wherein the distances between axis of rotations at the various attachment locations define the movement. The distance between axis of the pedal proximal hinge location attachment to the frame and the axis of the drive sprocket forms a virtual frame link F. The distance between the axis of the proximal hinge location of the pedal to the axis of the coupling link to pedal attachment defines a dimension P, the distance between pair of axis of the coupling link defines a dimension $C_2$ and the dimension between the pair of axis of the crank link defines a dimension $C_1$. The combination of dimensions F, P, $C_1$ and $C_2$ define the four bar linkage and are critical to the performance of the foot pedals and the vehicle. This drive mechanism as described provides a reciprocating pedal action wherein the rider can exert downward pressure on each downward pedal stroke to propel the vehicle. The foot pedals are set so when one pedal is at the bottom of its stroke, the other pedal is approximately at its maximum stroke relative to the other so that the rider can provide alternating propulsion strokes with each leg.

This drive mechanism is described in greater detail in U.S. patent application Ser. Nos. 12/554,366 filed on Sep. 4, 2009 entitled "Pedal-Drive System for Manually Propelling Multi Wheeled Cycles" and 12/848,567 filed on Aug. 2, 2010 entitled "Improved Scooter and Pedal Drive Assembly; the entirety of each application being incorporated herein by reference.

The present invention does not claim this four bar linkage drive system, but rather teaches and discloses a unique simulator device capable of providing optimal solutions to the physical location and dimensions of the four bar linkage system.

During the development of a reciprocating pedal drive system it was discovered that the positioning of the components on a vehicle frame such as a scooter or bicycle were critical. The dimensions and relative locations of F, P, $C_1$ and $C_2$ affected how the foot pedals moved. Minor adjustments of one element affected the entire pedal performance. Selection of these dimensions was such that minor variations in manufacturing tolerances during assembly could result in poor pedal action.

These problems were not simply poor pedal operation, but included a linkage lock up preventing pedal movement or even pedal reversal causing the linkages to change or reverse direction. The present invention describes a device to enable quick and reliable establishment of these critical dimensions.

SUMMARY OF THE INVENTION

A four bar drive link system simulator has a frame assembly, a proximal hinge attachment bracket, a bottom bracket simulator, a pair of crank levers, a pair of coupling levers and a pair of pedal simulator levers. The frame assembly has a plurality of guide rails, including at least a proximal hinge adjustment rail, and a frame simulator rail. The proximal hinge attachment bracket is connected to the proximal hinge adjustment rail. The bottom bracket simulator is attached or otherwise connected to the frame simulator rail. The pair of crank levers is each attached at a first end to an axle having its axis of rotation in the bottom bracket assembly, one crank lever being on one side of the bottom bracket assembly, the other on the opposite side. The pair of coupling levers is each attached to an opposite second end of the crank lever. The pair of pedal simulator levers is each pivotally attached to an end of the coupling lever and to an axis of rotation of the proximal hinge attachment bracket. The relative dimensions between the axis of rotation of proximal hinge and axis of rotation of the bottom bracket are adjustable by movement along the proximal hinge guide rail or the frame simulator guide rail or a combination of both.

The pair of pedal simulator levers each has an adjustable coupling attachment bracket. Movement of the adjustment bracket changes the dimensional distance between axis of rotation of the proximal hinge bracket and the pivotal attachment end of the coupling lever. The pedal simulator levers also each have a pedal stroke lever angularly adjustable to change the bend angle of the pedal simulator levers. The four bar drive link system simulator may have a second bottom bracket simulator slidably mounted onto the frame simulator guide rail. The second bottom bracket simulator has an axle to which a pair of sprockets can be attached. The frame assembly further may have a rear lateral guide rail onto which an adjustable rear wheel mounting assembly for attaching a rear wheel sprocket and axle assembly is affixed wherein chain alignment of the vehicle can be simulated and adjusted by lateral movement. In a preferred embodiment, the crank lever has a moveably adjustable coupling attachment to change the crank lever length between the axis of rotation of the bottom bracket and the coupling lever attachment. The crank lever may be a spider lever for attachment onto a drive sprocket and the spider lever has the adjustable coupling attachment. Similarly, the coupling levers may have movably adjustable pedal attachments for changing the coupling lever length between the crank lever attachment and the pedal simulator attachment.

BRIEF DESCRIPTION OF THE DRAWINGS

FIG. 6 being a perspective view, FIG. 6A being a top view and FIG. 7 being a side view.

FIG. 9 is a perspective view of an angular adjustable pedal lever portion of the pedal simulator made according to the present invention.

FIGS. 10A and 10B are opposite perspective views of the crank lever of FIG. 10.

FIG. 11 is a perspective exploded view of a coupling lever having an adjustable slide portion for changing the dimensional length of the coupling lever.

FIGS. 11A and 11B are opposite assembled views of the adjustable coupling length of FIG. 11.

DETAILED DESCRIPTION OF THE INVENTION

The present device, as illustrated in FIGS. 1 through 5, is directed to a four bar drive link simulator 10 which provides a fast, predictable way to establish optimum dimensions for a four bar drive link mechanism used on bicycles or scooters.

Figure 6:
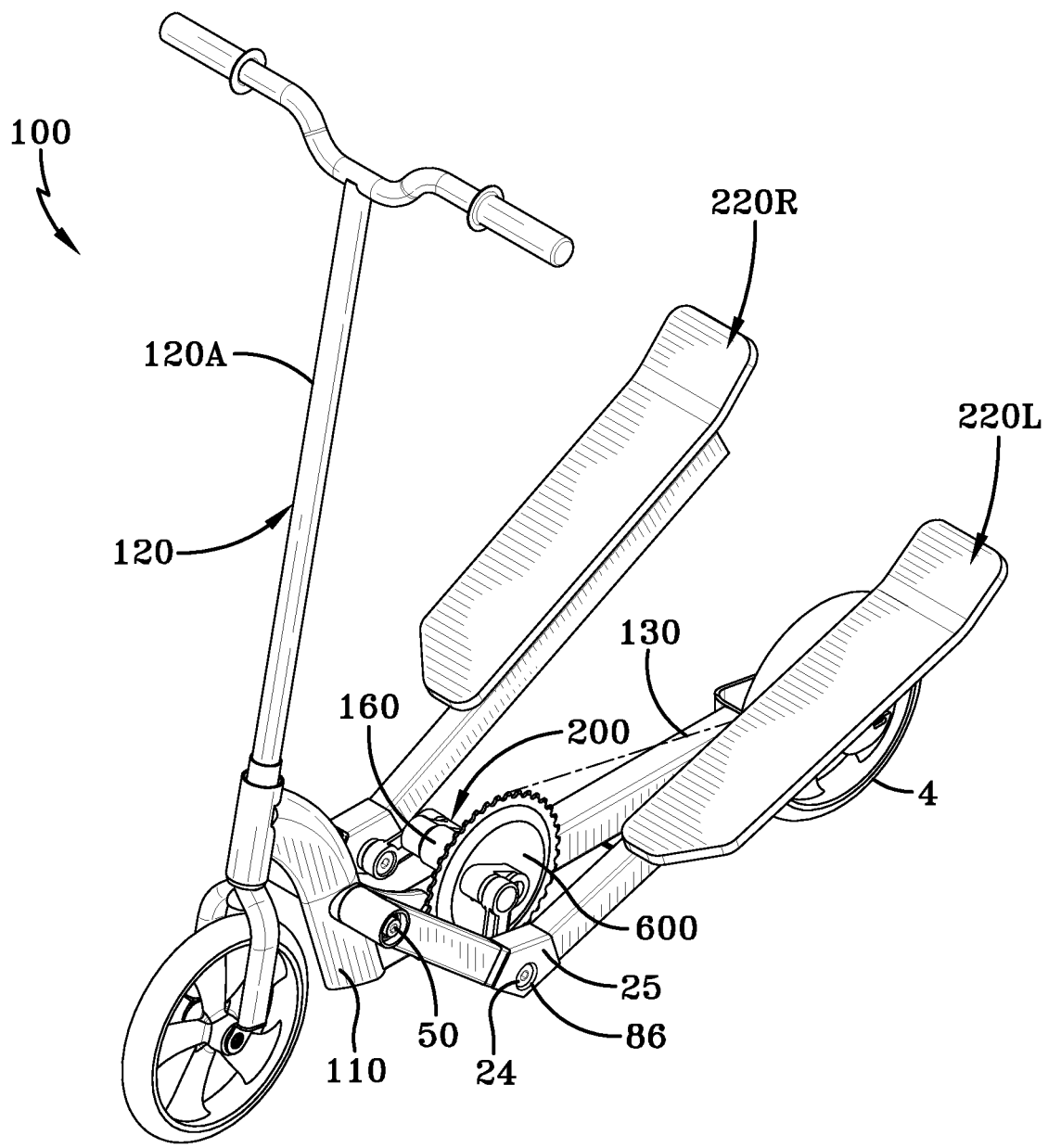
FIGS. 6, 6A and 7 are an exemplary scooter with a four bar drive link mechanism.
Figure 6A:
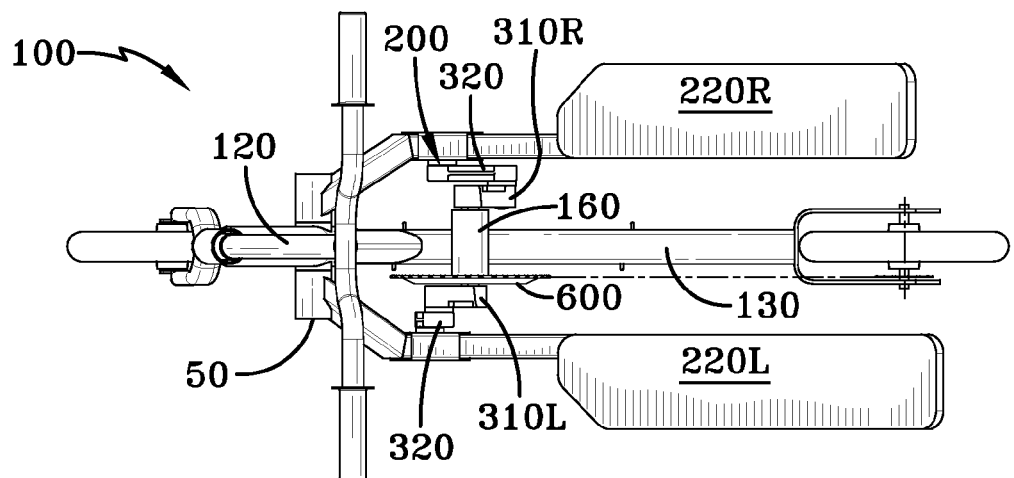
Figure 7:
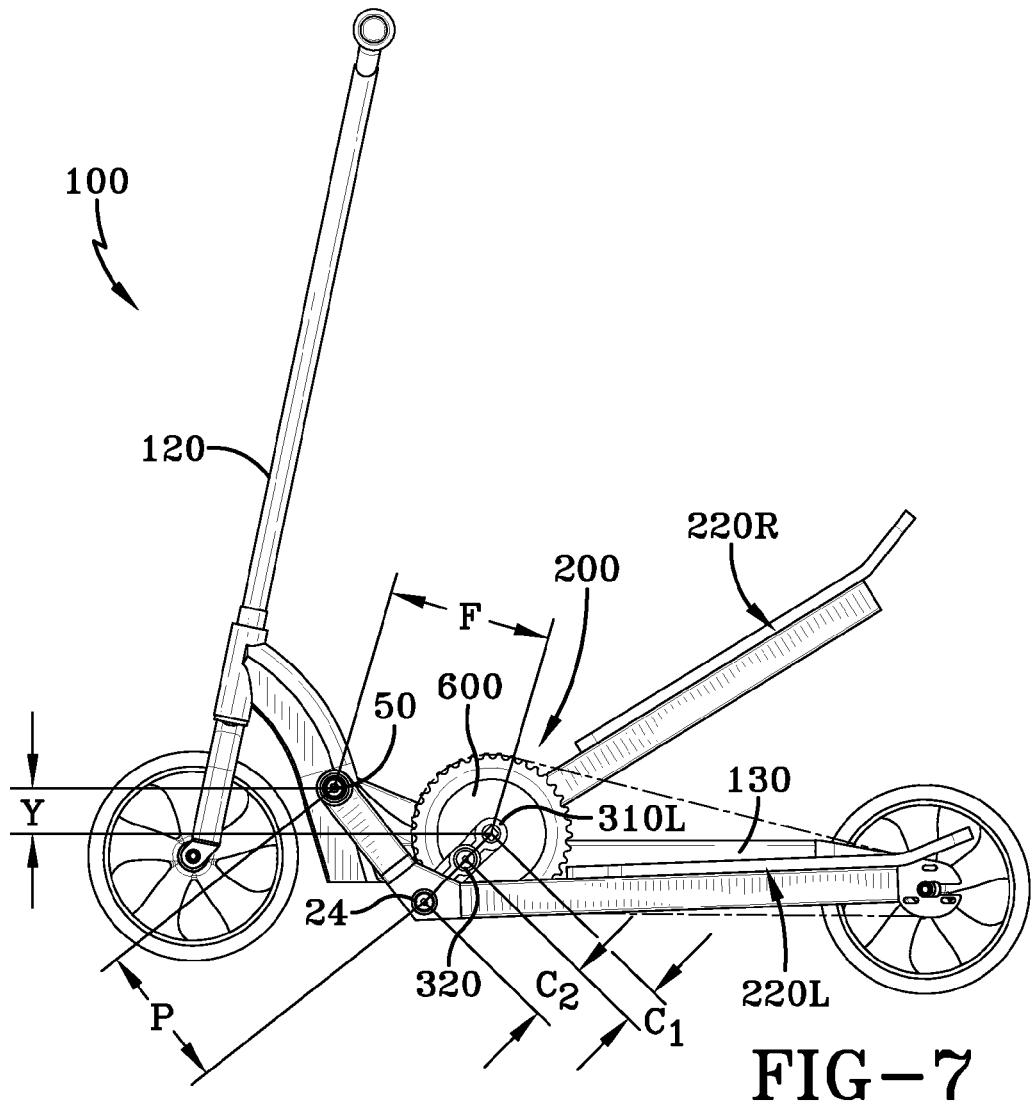

To better appreciate the function of the simulator 10, it is best to refer to an exemplary scooter 100 as shown in FIGS. 6, 6A and 7 to understand how the four bark drive link mechanism works in an actual vehicle.

With reference to FIGS. 6, 6A and 7, an improved pedal drive scooter 100 is illustrated. The scooter 100, as shown, has a frame 110 including a handlebar assembly 120 including the handle bar grips, a shaft 120A which extends through and is secured to a hub on the frame 110 of the scooter 100. The shaft extends below the hub to a forked portion which is secured to an axle on the front wheel of the scooter 100. The steering assembly 120 allows the front wheel to be maneuvered for steering and turning. The frame structure 110 extends from the hub rearwardly to a yoke which connects the rear wheel to the frame 110. As illustrated, the frame 110 has a step down portion which is connected to the hub and extends substantially downwardly to the bottom of a frame 110 to which a main frame support bar 130 is attached. As shown, at the attachment of the main support bar 130 to the step down portion of the frame 110, a supporting gusset is welded providing additional strength and stiffness at this location.

Welded onto the main support bar 130 is a bottom bracket 160, this bottom bracket 160 provides a location for a drive mechanism 200 assembly to be mounted. The drive mechanism 200, as illustrated, includes a drive sprocket 600. Attached to the drive sprocket 600 is a drive chain which extends rearwardly back to the rear wheel sprocket. The sprocket is attached to the axle of the rear wheel and as the device is operated, turns the rear wheel providing forward propulsion.

Attached to each side of the frame 110, as illustrated in FIGS. 6, 6A and 7, are a pair of foot pedals 220R and 220L. The foot pedals 220R and 220L are attached to the frame 110 at location 50. This location 50 will be referred to hereafter as the proximal hinge attachment location 50. The foot pedal 220L is a mirror image of the foot pedal 220R. These foot pedals operate in reciprocating motion, up and down and are connected to the drive mechanism 200 to provide forward propulsion. As the pedals are moved in an up and down direction, the sprocket is rotated moving the chain which in turn moves the rear sprocket, and propels the rear wheel.

The proximal hinge location 50 extends to the intersection at or near the bend to the reinforced pedal attachment location 24 and extends a distance P, as illustrated. A virtual frame link is created between the proximal hinge location 50 of the frame 110 and the axis if rotation or center of the axle of the drive mechanism 200. This virtual frame link distance is illustrated in FIG. 7 as a dimension F. The two ends of the frame link are fixed in location and do not move except rotationally relative to the other. As the pedals 220L and 220R reciprocate up and down, the coupling links 320 and the crank links 310L and 310R rotate along with the sprocket 600. As illustrated, the coupling link 320 extends from the pedal attachment location 24 back to a pin location connecting the coupling links 320 and the crank link 310L or 310R. This dimension is identified as $C_2$. Extending from the coupling link pin location and crank attachment, a distance of $C_1$ is illustrated extending back to the drive axle and the sprocket 600. It is important to note that the coupling link dimension $C_2$ is substantially larger than the crank link dimension $C_1$, as illustrated. Preferably, the coupling link dimension $C_2$ must be greater than the dimension $C_1$, furthermore, it is noted that the proximal hinge location 50 attaching the foot pedal 220L or 220R to the frame 110 extends vertically, preferably, above the drive axle location. This vertical distance is indicated as Y in this exemplary scooter design.

An important aspect of the dimensional positioning of the four bar linkage is proper rotation of the coupling link 320 and the crank lever 310L or 310R. If the locations are not accurately located, the drive mechanism 200 can lock up wherein a lock up phenomena is understood to occur at a top dead center location causing the links to bind, stopping the pedals from moving. A worse problem can occur wherein the linkages can actually reverse rotational direction. In this case a pedal can abruptly slam down as the links rotate opposite to their normal or desired movement. The present invention avoids these issues entirely by a proper selection of four bar link dimensions F, P, $C_1$ and $C_2$. These problems, while understood to exist, were not fully appreciated. Computer software which models and predicts dimensions for four bar linkage systems relies on the axle in the bottom bracket to be the driving location and as such the predicted optimal locations for such a device acted perfectly when one rotated at the axle by hand, but when the drive propulsion was moved to the location 24, as in the actual scooter device, these software optimum solutions would not operate properly. It was determined that each of the link dimensions and the relationship of $C_2$ being greater than $C_1$ and the proximal hinge location were all critical. This meant finding optimal dimensions was not predictable using standard software generated solutions. The performance of the present invention was greatly enhanced by the selection of the link dimensions and attachment locations on the frame 110. The solution found in the exemplary scooter allows for the dimensions to deviate slightly within normal manufacturing tolerance without the lock up or reversal issues that previously existed in the drive mechanism design.

The critical problem of using this type of four bar drive link mechanism in scooters and bicycles was finding a quick, reliable way to design and develop new frames, pedals and drive components that had predictable performance, acceptable manufacturing tolerances and avoiding the lock up or reverse rotational issues that simply were not easily predictable using computer modeling.

What was needed was a device that not only was reliable, but one in which the design engineers could confidently mimic real world performance of virtually unlimited range of dimensional variation to find optimal performance characteristics.

The present invention simulator shown in FIGS. 1-5 mimics the performance of the vehicle drive mechanism 200 so that prior to expending the tooling cost on a frame and drive assembly, the designers know with high confidence the performance of the drive mechanism.

With reference to FIGS. 1-5, the four bar drive link simulator 10 of the present invention is illustrated. As shown, the simulator 10 has a frame assembly 11, a proximal hinge attachment bracket 20, a bottom bracket simulator 40, a pair of crank levers 31L, 31R, a pair of coupling levers 32 and a pair of pedal simulator levers 22L, 22R. The frame assembly 11 has a plurality of guide rails including at least a proximal hinge adjustment rail 22 and a frame simulator rail 13. The proximal hinge adjustment rail 22, as shown on the simulator 10, extends generally vertically upwardly having guide slots 21 as illustrated. Attached to the proximal hinge adjustment rail 22 is a proximal hinge attachment bracket 20, this attachment bracket 20 is slidable on the guide rail 22 such that it can move up and down vertically as illustrated. This vertical movement enables the proximal hinge location 50 which will be a location on the frame of the vehicle to be properly duplicated or simulated. The proximal hinge attachment bracket 20 can be snugly secured at any position along the vertical guide rail 22 by using a threaded fastener locking the bracket 20 into a fixed position if so desired. Extending longitudinally along the simulator 10 is the frame simulator rail 13, similarly having a plurality of guide slots 14 onto which a bottom bracket simulator 40 is attached or otherwise connected. As shown, the bottom bracket simulator 40 can be moved along the frame simulator rail 13 such that it moves forward or aft simulating the location of a bottom bracket that would be welded or otherwise attached to a frame of a vehicle. These two movable brackets 20 and 40 of the simulator 10 establish attachment locations for the crank levers, coupling levers and pedals as illustrated. The proximal hinge location 50 has an axle 23 sticking outwardly such that a pedal simulator 22L or 22R can be slipped onto the axle of the proximal hinge bracket 20 to fix the location of the pedals 22L or 22R relative to the proximal hinge location 50. This pedal simulator 22L or 22R as shown can move vertically up and down relative to the simulator 10. As shown in FIG. 1A, one pedal simulator 22L is removed from the axle 23 of the proximal hinge bracket 20 clearly exposing the axle 23 as well as a pair of crank levers 31L, 31R and coupling levers 32 which are attached to the bottom bracket simulator 40. The crank lever 31R and the coupling lever 32 are connected to the pedal simulator 22R as illustrated in FIG. 1A such that they provide an attachment location onto the pedals and enable the drive mechanism 200 to then simulate the movement of the drive mechanism 200 by reciprocating motion of the pedal levers 25. To accomplish this one simply grasps the ends of the pedal levers 25 and moves them up and down repeating that action to simulate the performance of the drive mechanism 200.

Figure 4:
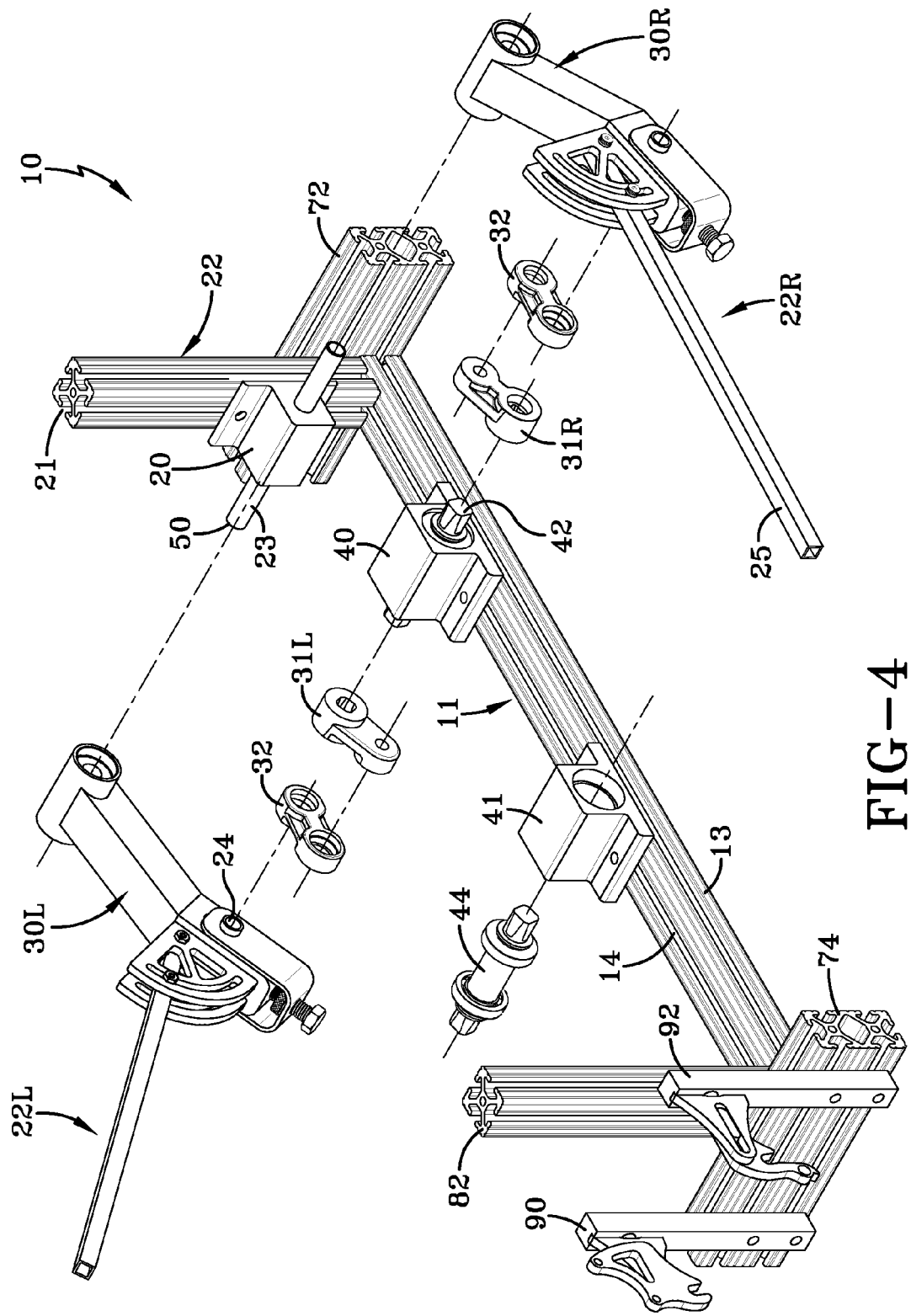
FIG. 4 is an exploded view of the four bar drive link simulator assembly of FIG. 1.
Figure 5:
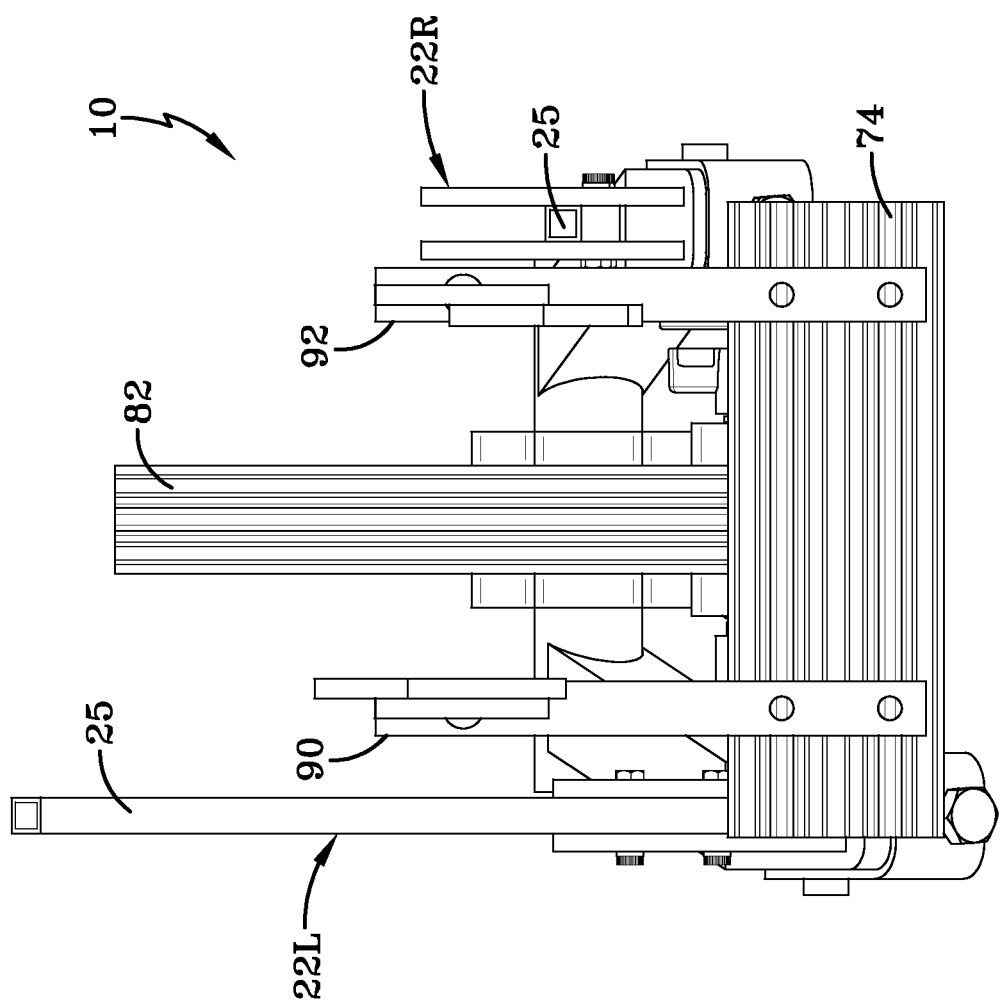
FIG. 5 is an end view of the four bar drive link simulator.

The exploded view of the simulator 10 shown in FIG. 4, illustrates the various locations of the components as previously described. As shown, at the forward and rear end of the simulator 10 a pair of laterally extending guide rails 72, 74 are attached to the frame simulator rail 13 and proximal hinge guide rail 22 on the forward part of the frame assembly 11. On the rear part of the frame assembly 11, as illustrated, a second vertical guide rail 82 is shown along with the lateral guide rail 74 to which a pair of rear wheel mounting brackets 90, 92 are shown, the rear wheel mounting brackets 90, 92 as illustrated, enable a rear wheel or rear wheel sprocket and hub to be attached such that a chain can be attached to either a sprocket attached on an axle 44 of the second bottom bracket 41 as illustrated or alternatively directly to a sprocket attached on the first bottom bracket 40. The sprockets not being illustrated in FIG. 4, however, it being understood that they can be attached directly onto the axles 42, 44 of the bottom bracket simulators 40, 41.

Figure 12:
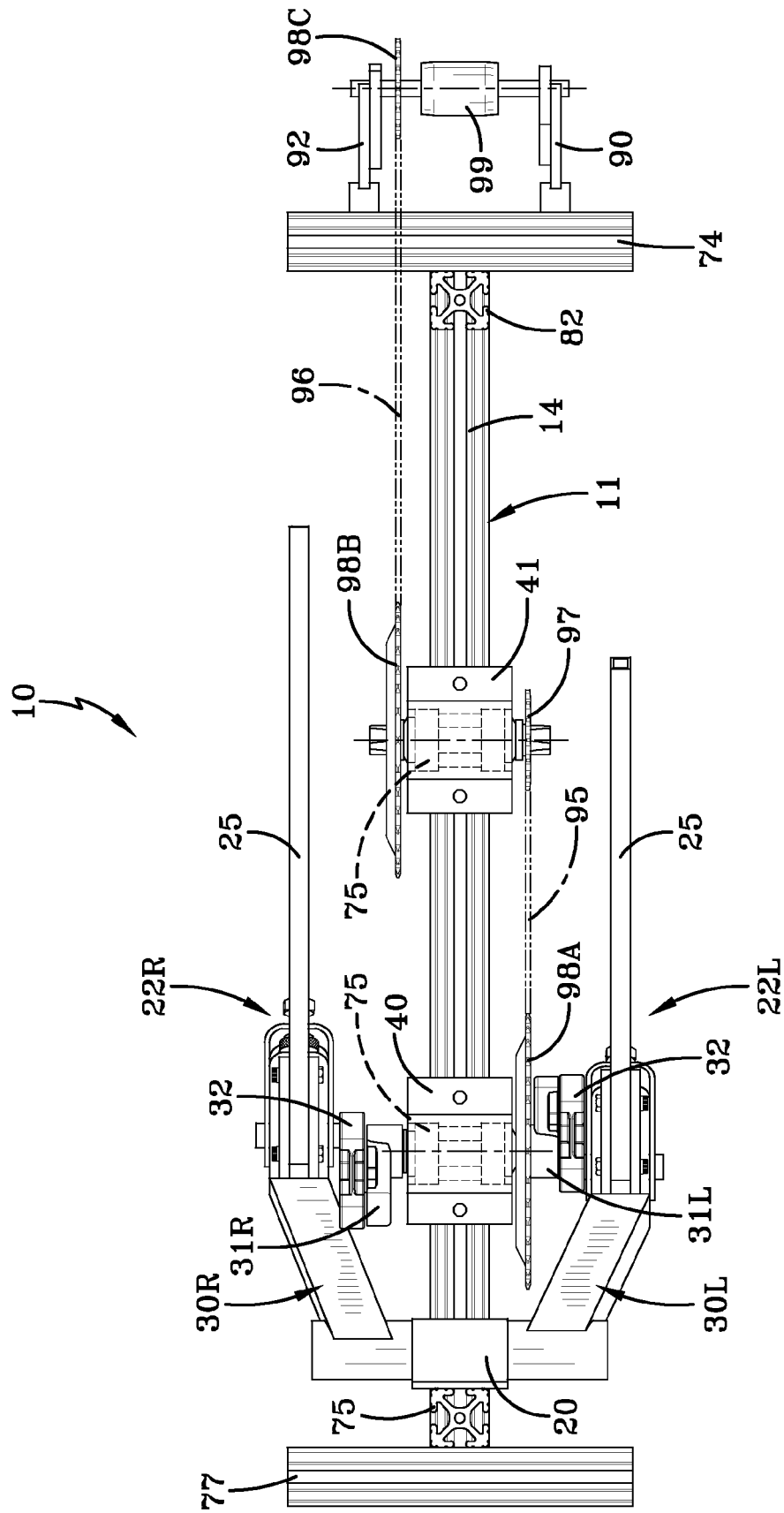
FIG. 12 is a top view of the simulator showing a rear wheel and sprockets and chains for chain alignment.

As shown in FIG. 12, a rear wheel hub assembly 99 can then be attached to the attachment brackets 90, 92 for a rear wheel such that chain alignment can be predicted and established using the simulator 10. This is a second feature of the simulator that enables a direct analysis of chain alignment to be predicted and made utilizing the simulator 10 as shown.

For better understanding of the adjustment capability of the simulator 10, it is understood that the bottom bracket simulator 40 attached to the frame simulator rail 13 enables a movement fore and aft along the simulator 10 whereas the proximal hinge bracket 20 enables a vertical movement up and down the proximal hinge guide rail 22 allowing for adjustment of the virtual frame link dimension F. As the virtual frame dimension F is adjusted, correspondingly the pedal link dimension P from the proximal hinge location 50 to the coupling attachment location 24 at the foot pedals 22L, 22R are correspondingly moved.

In order to accomplish this movement, the pedal simulator 22L and 22R as shown has a forward portion 30L, 30R which is shown slightly bent that attaches to the proximal hinge axle 23 at the forward hub end 35. At the rear end 37 as illustrated in FIG. 8A, has a slot 34 into which a cylindrical sleeve 38 fits. A screw attachment thread hole 39 has a bolt 65 attached. A thumb lock down nut 66 secures a movable bracket 36 that is attached to the sleeve 38 at the holes 36A, 36B enables this location to be moved fore and aft. This allows the link dimension P to be adjusted by simple turning of the threaded fastener or bolt 65 which moves the bracket 36 and correspondingly enables the sleeve 82 in the slot 34 to be moved either forward or aft as so desired. The bolt 65 passes through the hole 36C in the bracket 36 and the bracket is fixed by the thumb nut 66.

Figure 9A:
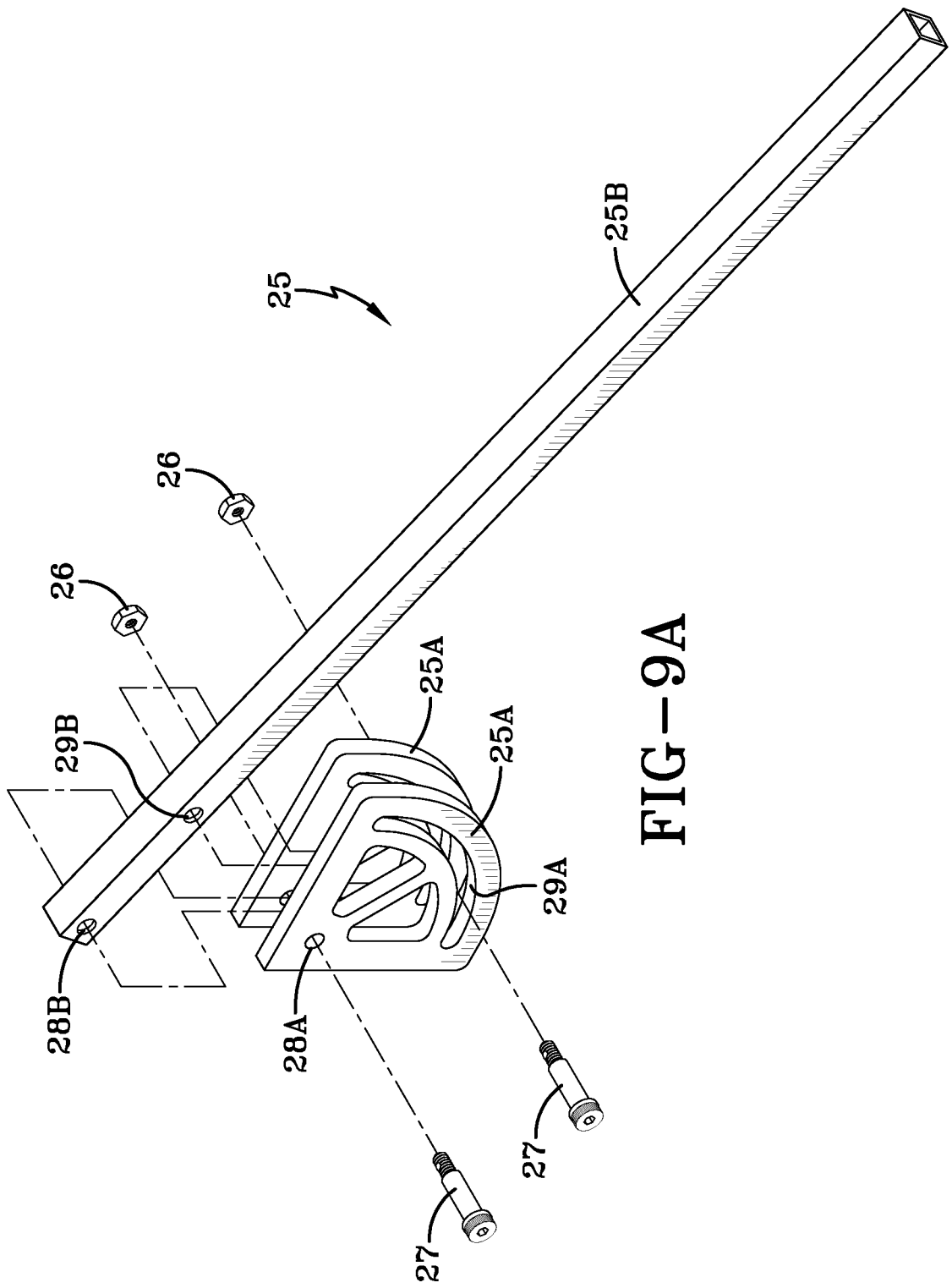
FIG. 9A is an exploded view of the angular adjustable pedal lever portion of FIG. 9.

With reference to FIGS. 9 and 9A, a pedal lever assembly 25 is shown, the pedal lever assembly 25 includes a pair of threaded fasteners 27 to which nuts 26 are applied that extend through a hole 28 locating a pair of angular orientation brackets 25A to be connected to the lever 25B as shown, the brackets 25A have holes 28A at one end that allow the threaded fastener 27 to slip through a hole 29B in the lever 25B and be connected by a nut 26 at the other end. At the arcuate end of the bracket 25A is an arcuate slot 29A, the fastener can be slipped through the slot 29A and into a second hole 29B in the lever arm 25B and a nut 26 attached to it. Adjustment of the angle can be achieved by simply loosening the second fastener 27 such that an angular movement in the 29A of the bracket 25A can occur.

Figure 8:
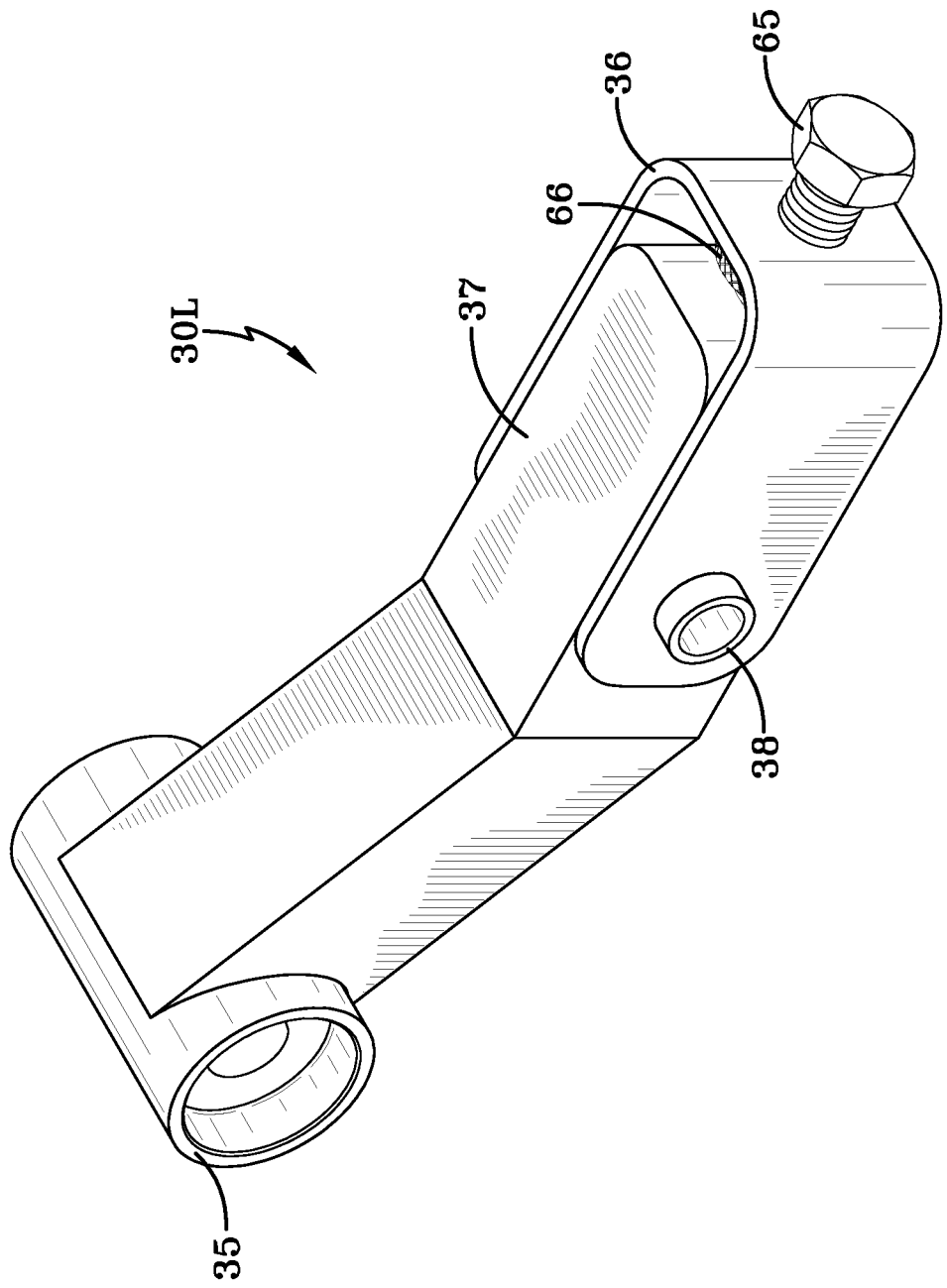
FIG. 8 is a perspective view of an adjustable pedal portion of a pedal simulator made according to the present invention.
Figure 8A:
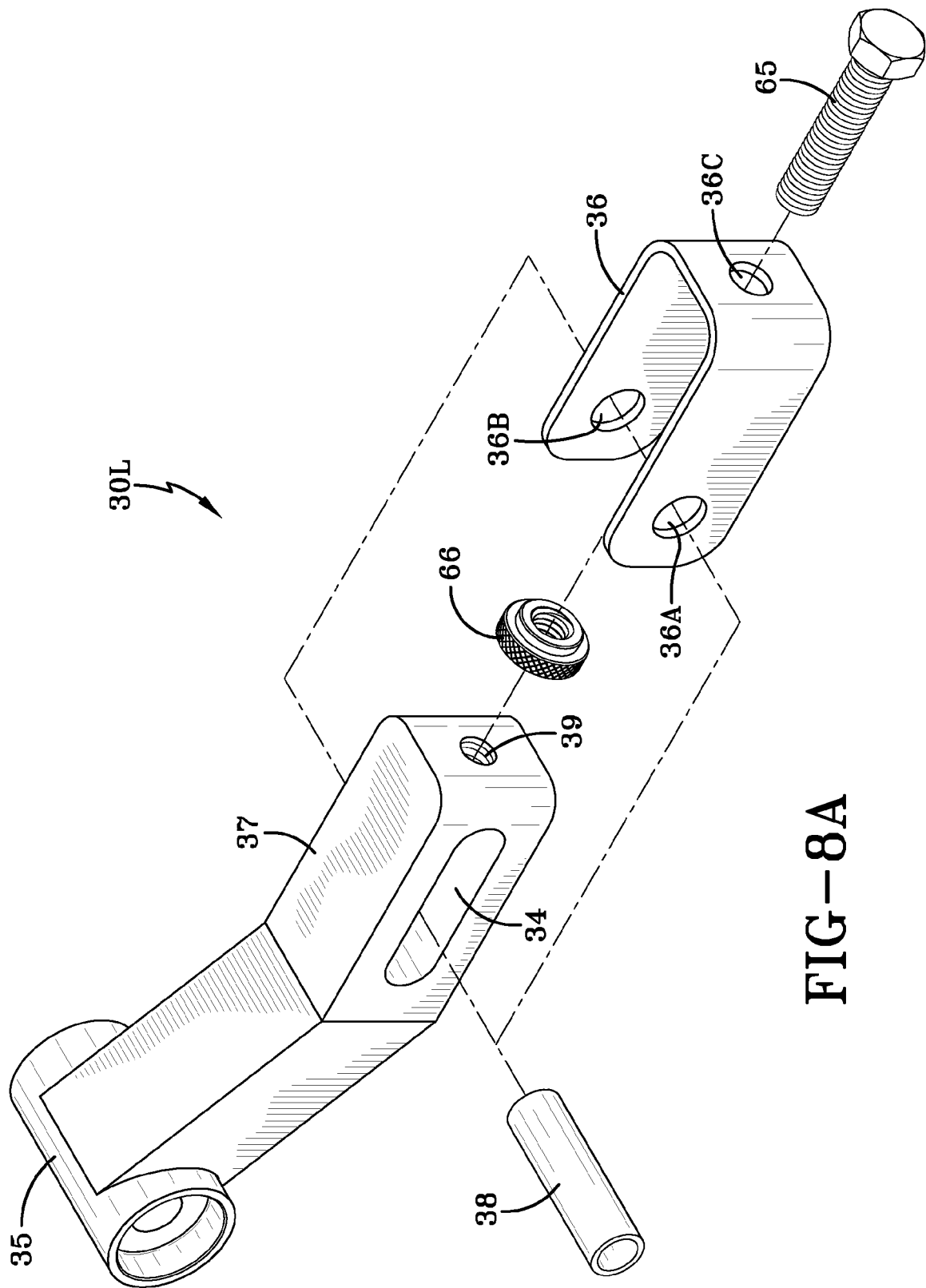
FIG. 8A is an exploded view of the adjustable pedal portion of FIG. 8.

This pedal lever assembly 25 of FIG. 9 is then welded or otherwise attached to the portion 37 of the bracket 30L, or 30R shown in FIG. 8 and as illustrated in FIG. 4 in the exploded view. As illustrated, this enables the pedal lever simulator 22L, 22R to be adjusted not only dimensionally fore and aft to change the link dimension P by tightening or loosening the bolt 65, but also angularly to change the angle of the pedal lever assembly 25 such that vertical movement up and down can be adjusted. In doing so, it must be noted that as illustrated, the simulator 10 allows the pedal on one side to be at a substantially horizontal position while on the opposite side the pedal is at the maximum angled position. This is how the pedals operate. The bottom of the stroke which is generally set at a horizontal position and the opposite pedal is at its maximum or peak position of the stroke reciprocating movement alternates these positions and is what drives the drive mechanism in a reciprocating fashion so that the pedals can continuously move. If so desired, at the bottom of the stroke, the angle could be extended slightly below horizontal.

Figure 1:
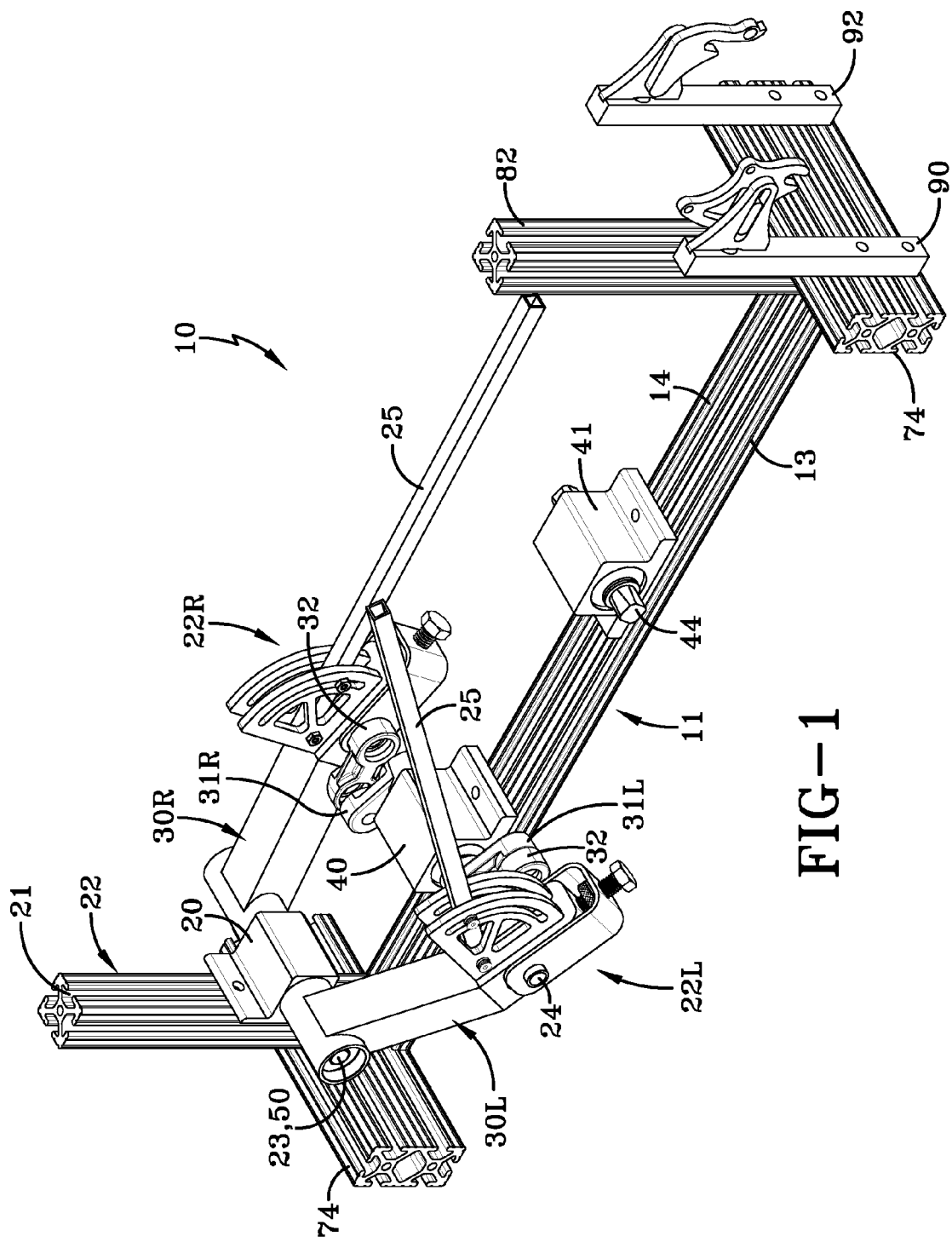
FIG. 1 is a perspective view of the present invention four bar drive link simulator.
Figure 1A:
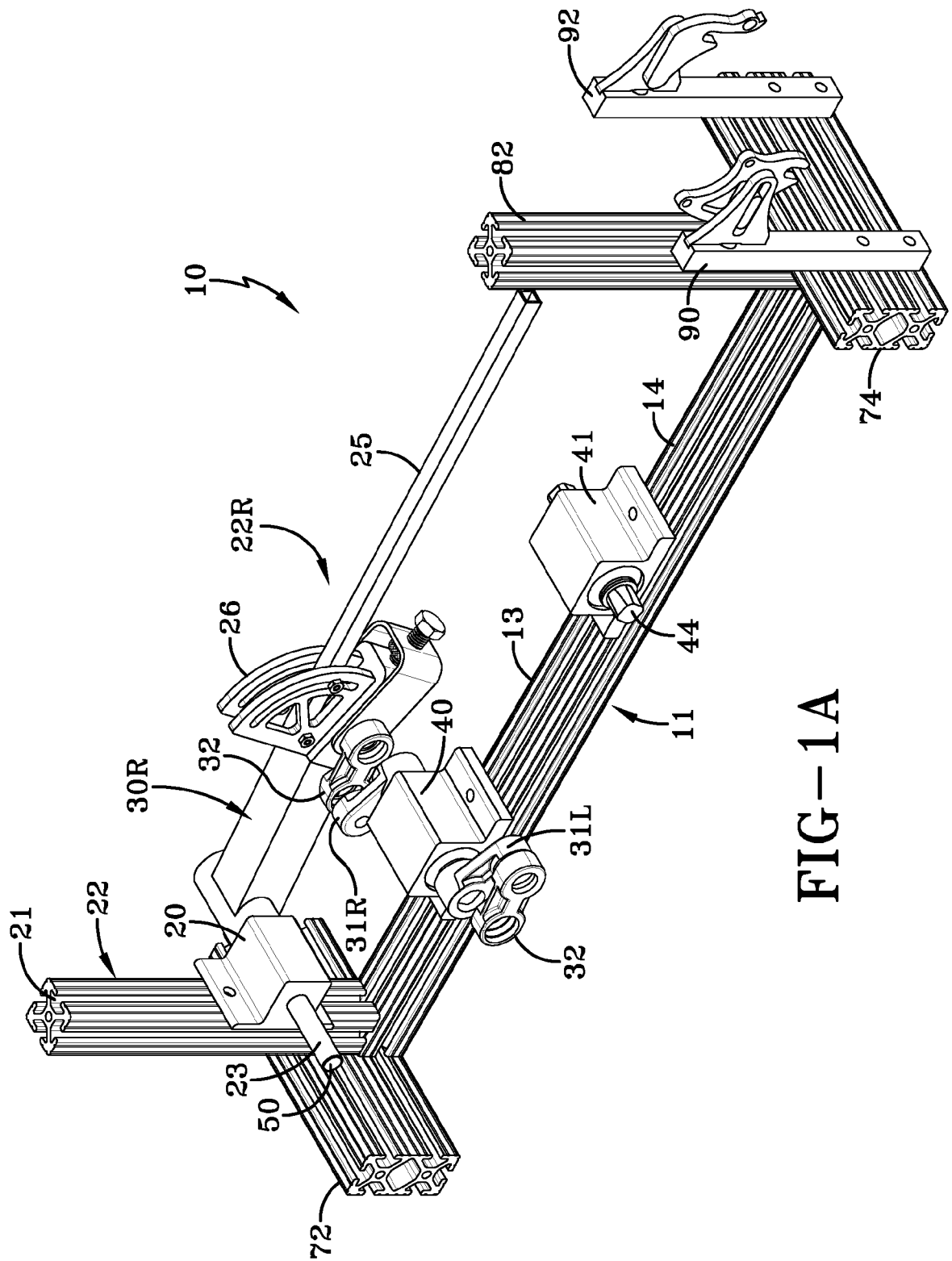
FIG. 1A is the perspective view of the four bar drive link simulator of FIG. 1 with one pedal simulator removed to allow viewing of the crank lever and coupling lever.
Figure 2:
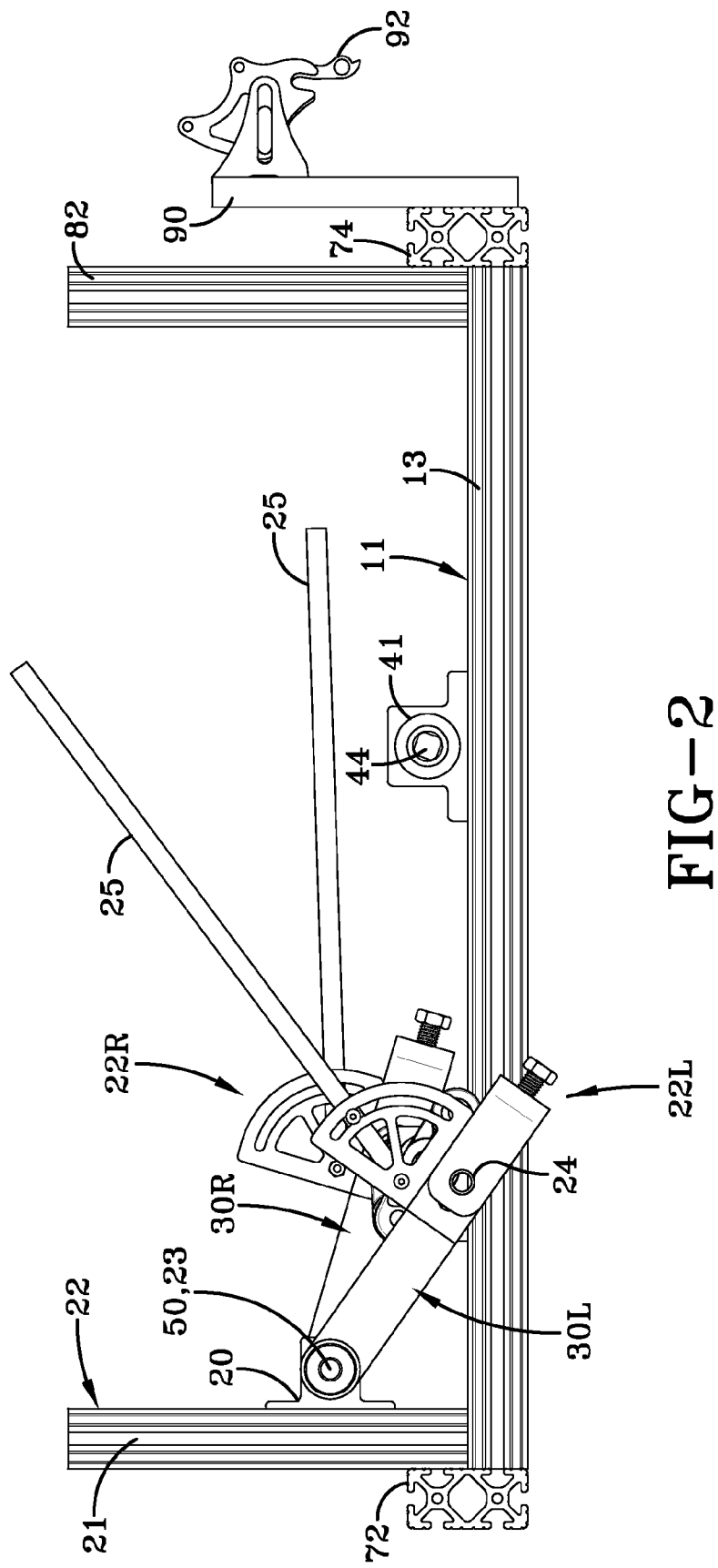
FIG. 2 is a side plan view of the four bar drive link simulator made according to the present invention.
Figure 3:
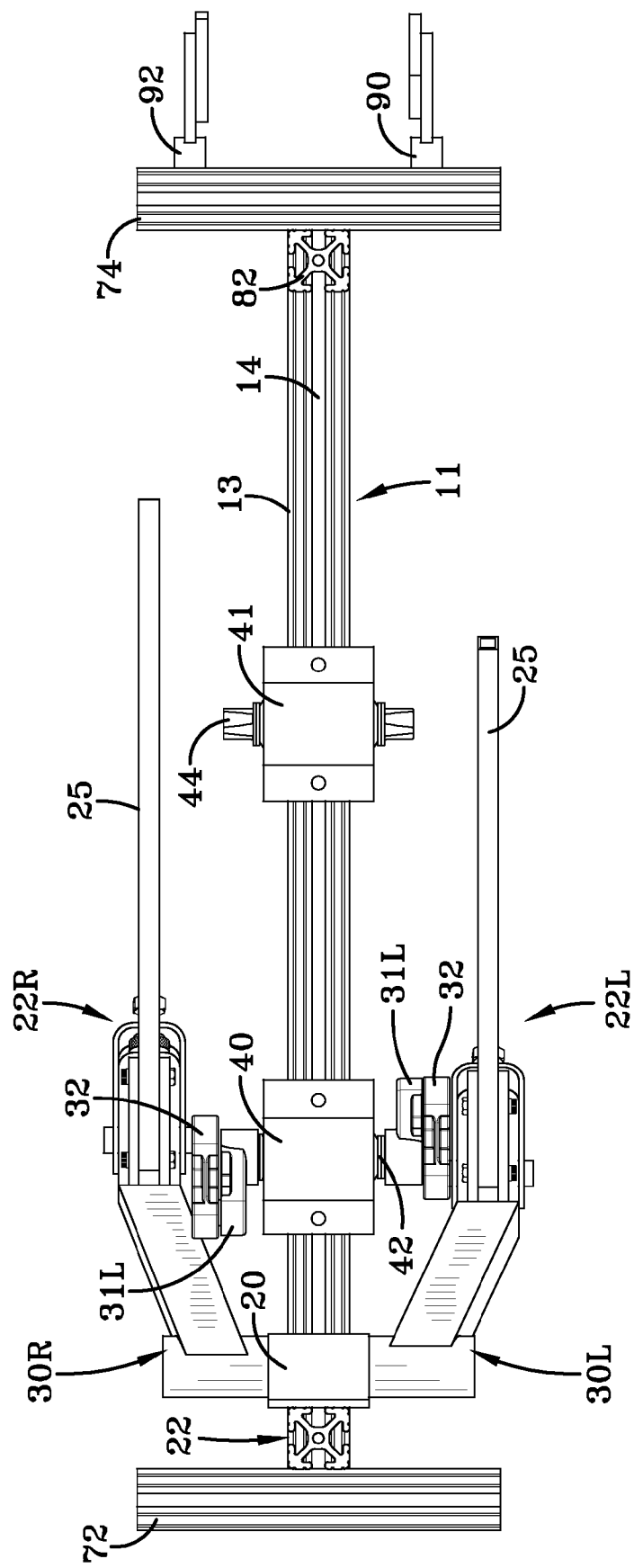
FIG. 3 is a top view of the four bar drive link simulator made according to the present invention.
Figure 10:
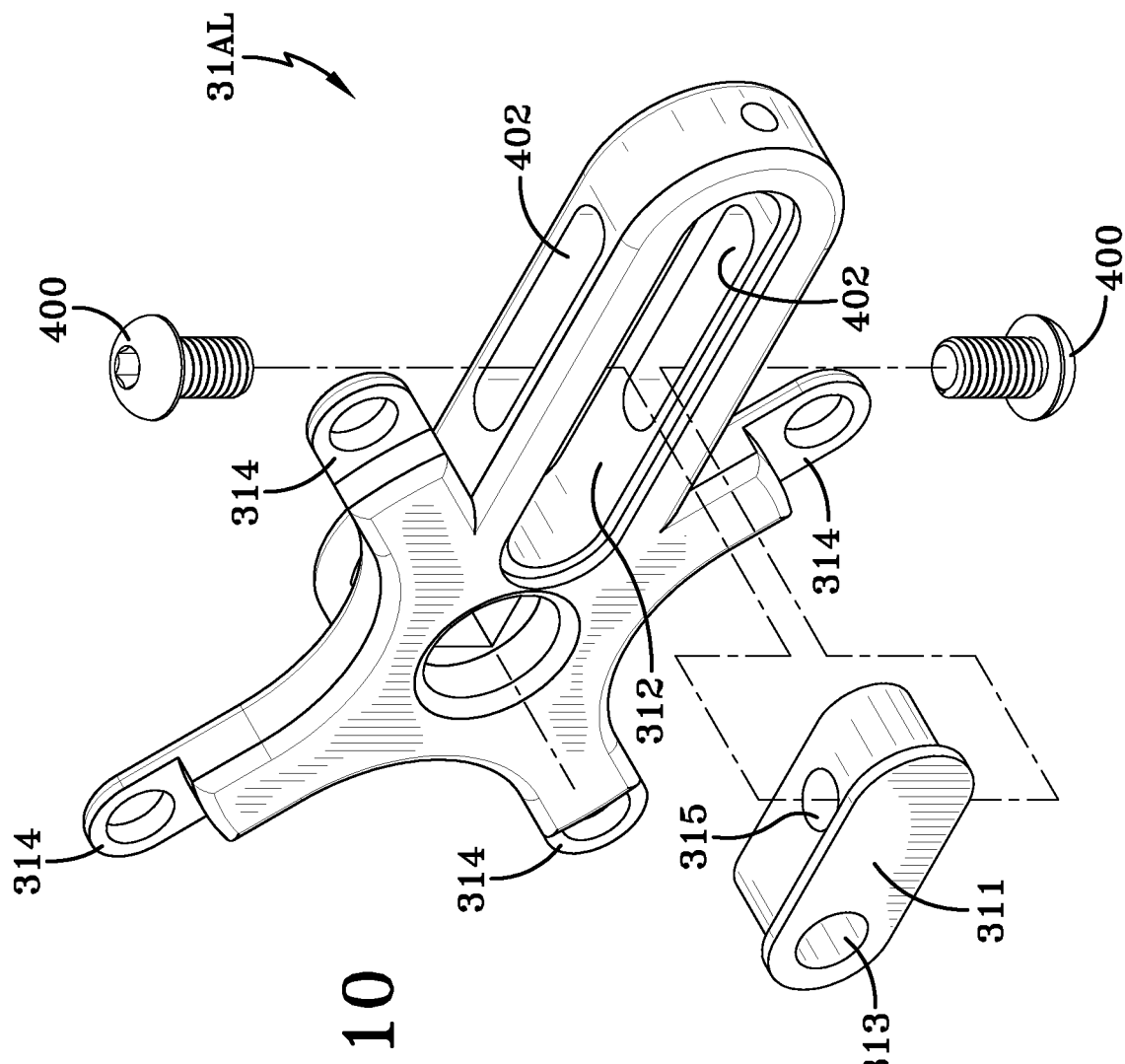
FIG. 10 is an exploded perspective view of a crank lever made in a spider construction for direct attachment onto a drive sprocket with an adjustable slide for changing the dimensional length of the crank length.

The simulator 10 shown in FIGS. 1 and 4 had fixed coupling levers 32 and fixed crank levers 31L, 31R such that the dimensions are fixed $C_2$ and $C_1$ respectively. In order to make additional adjustments with regard to these features, and to find optimal coupling lever and crank lever dimensions, it was determined that an adjustment feature could also be provided on a crank lever and a coupling lever. To achieve this, adjustment slots are provided in both of these components. This feature is as illustrated in FIGS. 10, 10A and 10B for an exemplary spider crank lever 31AL, the spider crank lever 31AL is a type of device that attaches or bolts directly onto a drive sprocket of a vehicle at the four spider arms 314. As shown in FIG. 10, this spider crank lever 31AL can have a slide 311 that fits in the slot 312. This slide component 311 is slidably moveable within the slot 312, but can be fixed at any location within the slot 312 by threaded fasteners 400 as illustrated. The fasteners 400 fit in slots 402 and fasten in the holes 315 in the slider 311. The opposite perspective views shown in FIGS. 10A and 10B, show the slide 311 moved to a most forward location wherein the dimension $C_1$ would be at a minimum on this device. To make an adjustment increasing the length, one would simply move the slider 311 aft and the distance between the attachment and the axle 42 on the bottom bracket simulator 40 and the coupling attachment opening 313 shown in the slider 311 would move in such a direction enabling an increase in length of the dimension $C_1$.

As shown in FIGS. 11, 11A and 11B; a coupling lever 32A is illustrated having a similar slider 311 that can be inserted into a slot 312 in the coupling lever 32A. This coupling lever 32A can then have the slider 311 fastened using threaded fasteners 400 as illustrated. In this component, the coupling lever 32A can be designed so that adjustments can be made in the dimension $C_2$ between the pedal attachment location 24 and the crank attachment location 313. This dimension $C_2$ can be adjusted increasing or decreasing the length if so desired. As shown in FIGS. 11A and 11B, the coupling lever 32A has the slider 311 at a minimum location; movement in an opposite direction in the slot 312 would allow the dimension $C_2$ to be increased substantially. As such, a large number of variations can occur within the adjustable crank levers 31AL, 31AR and coupling levers 32A. As these elements are placed on the simulator, not only can the dimensions P and F be adjusted along the guide rails 22, 13, but also by providing a pedal lever simulator 22L, 22R with an adjustment feature, along with crank levers and coupling levers with slidable adjustment features, every dimension used in establishing a four bar link system can be adjusted. These adjustments can be made either singularly or in combination to create virtually any combination of four bar drive link system dimensions desired within the range of the components ability to be adjusted. This provides the designer with almost an infinite range of selectable solutions for the drive mechanism used in such scooters and bicycles.

In using the simulator 10 as illustrated, the drive mechanism can be adjusted in a variety of ways. This drive mechanism dimensions, once established at an optimum by repeated movement of the pedal simulator levers as illustrated, enable the designer to get a feel for the actual movement that will be achieved in the finished scooter or bicycle. Instead of using feet to drive the pedal lever arms 25, it is desirable to use ones hands and to move these levers up and down simulating the motion of the feet, in doing so the operator gets a feel for the ease in movement of the four bar link system and as such can make minor adjustments until the movement is felt to be optimal. Once the movement is optimally set, the engineer can simply take the measurements relative to the axis of rotation of each of the attachment locations such that these dimensions are established. These dimensions; F, P, $C_1$ and $C_2$ are clearly established by the simulator.

When using the simulator device 10 the procedure for fixed links outlined below can be followed to establish the four bar drive link dimensions. Step 1: Choose approximate angle of bend for pedals. Step 2: Choose approximate distance between bolts in pedal. Note: increasing distance will decrease pedal stroke angle. In turn, decreasing distance will increase pedal stroke angle. Step 3: Adjust height of proximal hinge and linear distance of bottom bracket until pedal is at an angle of zero degrees from horizontal when at bottom of stroke. Step 4: Continue to adjust linear distance of bottom bracket until drive system rotates freely. Fine tuning is necessary to find the best location of bottom bracket and to obtain tolerances for manufacturing. If pedal stroke angle is not as desired, adjust the distance between the bolts in the pedal. Increase the distance to decrease the angle, in turn, decrease the distance to increase the angle. Repeat steps 3-4. Once desired angle is achieved, adjust the pedal bend angle to zero when at bottom of stroke.

When using the simulator device 10 the procedure for adjustable links outlined below can be followed to establish the four bar drive link dimensions. Step 1: Choose approximate angle of bend for pedals. Step 2: Choose approximate distance between bolts in pedal. Note: increasing distance will decrease pedal stroke angle. In turn, decreasing distance will increase pedal stroke angle. Step 3: Choose approximate dimensions for links. Note: Linear length of Crank link should be greater than that of the Coupler link. Note 2: Increasing the length of the Crank link increases tolerances, decreasing the length decreases tolerances. The combined length of the longest length and the shortest length must not be greater than the combined length of the remaining two links. Step 4: Adjust height of proximal hinge and linear distance of bottom bracket until pedal is at an angle of zero degrees from horizontal when at bottom of stroke. Step 5: Continue to adjust linear distance of bottom bracket until drive system rotates freely. Fine tuning is necessary to find the best location of bottom bracket and to obtain tolerances for manufacturing. If pedal stroke angle is not as desired, adjust the distance between the bolts in the pedal. Increase the distance to decrease the angle, in turn, decrease the distance to increase the angle. Repeat steps 3-4. Once desired angle is achieved, adjust the pedal bend angle to zero when at bottom of stroke. Once this has been accomplished, the designer can feel confident that the drive mechanism simulation has provided him with a solution that will provide a good, reliable and predictable drive mechanism.

Once this is accomplished, the other aspect of this invention is to use the rear portion of the simulator 10 to attach a wheel or hub 99 as illustrated and to attach sprockets 98 onto the either second bottom bracket 41 or simply the first bottom bracket 40 and to provide for chain alignment, as shown in FIG. 12. Chain alignment is critical because in a two chain system, the drive sprocket 98A is on one side extending back to a smaller sprocket 97 on the second bottom bracket 41 which is also connected on the opposite side to a larger sprocket 98B which is then connected to a rear wheel hub sprocket 98C to put drive propulsion to the rear wheel. This creates potential for misalignment of the chains 95, 96; accordingly it is important that the simulator 10 provides for chain alignment variations and the engineer can then take measurements off of the simulator 10 to establish proper dimensions on the frame and locations that the bottom brackets must be welded to the frame in order to achieve proper chain alignment and also to provide proper attachment locations for the rear wheel assembly onto the frame itself. These features are all achieved with the present invention as illustrated and described above, while variations and minor adjustments can be made, it is understood that this simulator will provide a predictable and reliable way of establishing a four bar drive link system for a scooter or bicycle having reciprocating pedals as described herein.

As illustrated, each of the attachment locations where pivotal motion occurs, it may be desirable to provide bushings or bearings to smooth rotation, assuming the vehicle being simulated employs these components. Therefore, the use of such bushings and bearings is used if they are also used on the vehicle. Furthermore, the axles 42, 44 of the bottom brackets can be square or round splined ends, but similarly should match the vehicle being simulated.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. A four bar drive link system simulator comprises:
    a frame assembly, the frame assembly having a plurality of guide rails, including at least a proximal hinge adjustment rail, and a frame simulator rail;
    a proximal hinge attachment bracket connected to the proximal hinge adjustment rail;
    a bottom bracket simulator attached or otherwise connected to the frame simulator rail;
    a pair of crank levers, each being attached at a first end to an axle having an axis of rotation in the bottom bracket assembly;
    a pair of coupling levers each attached to an opposite second end of the crank lever;
    a pair of pedal simulator levers, each being pivotally attached to an end of the coupling lever and to an axle having an axis of rotation in the proximal hinge attachment bracket; and
    wherein the relative dimensions between the axis of rotation of proximal hinge and axis of rotation of the bottom bracket are adjustable by movement along the proximal hinge guide rail or the frame simulator guide rail or a combination of both.

2. The four bar drive link system simulator of claim 1 wherein the pair of pedal simulator levers each has an adjustable coupling attachment bracket, movement of the adjustment bracket changes the dimensional distance between axis of rotation of the proximal hinge and the pivotal attachment end of the coupling lever.

3. The four bar drive link system simulator of claim 2 wherein the simulator further comprises: a second bottom bracket simulator slidably mounted onto the frame simulator guide rail, the second bottom bracket simulator having an axle to which a pair of sprockets can be attached.

4. The four bar drive link system simulator of claim 3 wherein the frame assembly further comprises a rear lateral guide rail onto which an adjustable rear wheel mounting assembly for attaching a rear wheel sprocket and axle assembly is affixed wherein chain alignment of the vehicle can be simulated and adjusted by lateral movement.

5. The four bar drive link system simulator of claim 1 wherein the pedal simulator levers each have a pedal lever angularly adjustable to change the pedal bend angle.

6. The four bar drive link system simulator of claim 1 wherein the crank lever has a moveably adjustable coupling attachment to change the crank lever length between the axis of rotation of the bottom bracket and the coupling lever attachment.

7. The four bar drive link system simulator of claim 6 wherein the crank lever is a spider lever for attachment onto a drive sprocket and the spider lever has the adjustable coupling attachment.

8. The four bar drive link system simulator of claim 1 wherein the coupling lever has a movably adjustable pedal attachment for changing the coupling lever length between the crank lever attachment and the pedal simulator attachment.

* * * * *